United States Patent [19]

Geiger et al.

[11] Patent Number: 5,159,487
[45] Date of Patent: Oct. 27, 1992

[54] OPTICAL PARAMETRIC OSCILLATOR OPO HAVING A VARIABLE LINE NARROWED OUTPUT

[75] Inventors: Allen R. Geiger; Narasimha S. Prasad, both of Las Cruces, N. Mex.

[73] Assignee: LaSen, Inc., Las Cruces, N. Mex.

[21] Appl. No.: 706,753

[22] Filed: May 29, 1991

[51] Int. Cl.⁵ .............................................. G02B 5/23
[52] U.S. Cl. ......................................... 359/330; 372/21
[58] Field of Search ........................... 372/21; 359/330

[56] References Cited

U.S. PATENT DOCUMENTS

| | | | |
|---|---|---|---|
| 3,662,183 | 5/1972 | Ashkin et al. | 359/330 |
| 4,085,335 | 4/1978 | Guilino | 359/330 |
| 4,180,751 | 12/1979 | Ammann | 307/428 |
| 4,189,652 | 2/1980 | Levinos et al. | 372/98 |
| 4,349,907 | 9/1982 | Campillo et al. | 372/21 |
| 4,639,923 | 1/1987 | Tang et al. | 372/21 |
| 4,897,562 | 1/1990 | Krasinski et al. | 359/330 |
| 5,028,816 | 7/1991 | Boczar | 372/21 |
| 5,033,057 | 7/1991 | Bosenberg et al. | 372/21 |
| 5,034,951 | 7/1991 | Edelstein et al. | 372/22 |
| 5,038,352 | 8/1991 | Lenth et al. | 372/21 |
| 5,038,359 | 8/1991 | Pepper et al. | 372/21 |

*Primary Examiner*—Rolf Hille
*Assistant Examiner*—Mahshid Saadat
*Attorney, Agent, or Firm*—Kramer, Brufsky & Cifelli

[57] ABSTRACT

An optical parametric oscillator includes a pump laser for producing a pump beam, an optical resonator, an OPO crystal disposed within the optical resonator aligned with and responsive to the pump beam to produce a parametrically generated output, and a device external to the optical resonator for line narrowing the parametrically generated output. In one embodiment of the invention, the device is a grating and in another embodiment of the invention the device is an acousto-optic cell.

17 Claims, 2 Drawing Sheets

OPTICAL PARAMETRIC OSCILLATOR OPO HAVING A VARIABLE LINE NARROWED OUTPUT

TECHNICAL FIELD OF THE INVENTION

The present invention relates generally to optical parametric oscillators, hereinafter referred to as "OPO's" and, more particularly, to an OPO having a variable line narrowed output.

BACKGROUND OF THE INVENTION

Very high power densities made available by lasers have made it possible to observe the nonlinear behavior of optical media, such as crystals. Frequency doubling is an example of such nonlinear behavior. Frequency doubling is a specific example of what is known as the sum-frequency generation process, and occurs when an incident radiation of frequency v, on propagating through some crystalline material, emerges as radiation consists of a mixture of two frequencies, the original frequency v and a new frequency 2 v.

The inverse of the aforementioned sum-frequency process is the optical parametric process, wherein incident radiation having a frequency v, on propagating through a nonlinear medium is converted into two lower frequency (higher wavelength) waves, which are of essentially variable frequency.

Optical parametric systems can be used to generate secondary (parametrically generated) radiation from a monochromatic coherent (incident) primary radiation by means of parametric interaction with an optically nonlinear medium. The secondary radiation has two components, one of which typically has a shorter wavelength than the other, although it is possible that both of the two components can have the same wavelength. The condition is known as "degeneracy." The wavelengths of both secondary radiation components are longer than that of the primary radiation. The wavelength of a secondary radiation component can be freely selected and can be adjusted by a suitable arrangement, typically by rotation of the optically nonlinear medium within the optical resonator of the parametric system. The wavelength of the other component will be determined based on energy conservation. The optical parametric system can be used in combination with a coherent source of primary optical radiation, for example a laser, to provide a source of optical radiation whose wavelength can be selected more or less as desired within a desired frequency range.

In a parametric oscillator, the relationship between the "pump" frequency ($f_p$) of the incident radiation and the "signal" ($f_s$) and "idler" ($f_i$) parametrically generated component frequencies is given as: $f_p = f_s + f_i$ As the OPO is tuned away from "degeneracy", wherein the signal and idler frequencies are equal, the signal and idler wavelengths change, with the former (signal wavelength) decreasing and the latter (idler wavelength) increasing. Further, as the OPO is tuned well away from degeneracy, the signal and idler wavelengths become well separated, a consequence of which is that their indices of refraction will differ.

Usually, crystals are used as the optically nonlinear medium.

Examples of crystals exhibiting the desired nonlinear effects are KDP, $LiNbO_3$, $Ba_2Na(NbO_3)_5$ or $LiO_3$. Since these nonlinear media exhibit relatively weak parametric interaction, it is known to locate the nonlinear medium within an optical resonator formed by mirrors, so that the radiation passes repeatedly through the medium. However, this creates a substantial problem with respect to coupling radiation into and out of the resonator. Hence, it has been known to employ mirrors, defining the resonator, which are highly transmissive for the primary radiation and highly reflective for the secondary radiation. This requirement is difficult to meet, when the parametric arrangement is intended to be continuously tunable regarding the wavelength of the secondary radiation, since the mirrors have to be highly reflective at a region close to the wavelength of the primary radiation, and the range of high reflectivity should be wide over a wide range of wavelengths. In practice, the reflectivity should be on the order of 80 to 95%. Even the most highly developed dichroic mirrors, made of multiple dielectric layers, only partially meet this requirement, and then only at great cost.

U.S. Pat. No. 4,639,923 describes an optical parametric oscillator (OPO) using a urea crystal. This crystal makes the OPO broadly tunable, so that the entire spectral range from the ultraviolet to the near infrared is accessible. Further, the urea OPO is angle-tunable, and has a high efficiency.

U.S. Pat. No. 4,085,335 describes an optical parametric device wherein the coupling means, or arrangement in the parametric system, includes a dichroic mirror located in the path of the optical resonator, which dichroic mirror is arranged at an inclination with respect to the path of radiation within the resonator. The mirror has a high reflectivity for the primary radiation and a high transmissivity for the secondary radiation.

U.S. Pat. No. 4,180,751 describes a mode-locked optical parametric oscillator apparatus wherein the OPO cavity length is substantially smaller than the pump laser cavity length and in which the oscillator mirrors are singly resonant at either the signal or idler (pulse) frequencies. This configuration is intended to generate non-resonated OPO pulses which replicate mode-locked pump pulses, and both sets of pulses coupled to the resonated OPO pulse over a relatively wide tuning range without adversely affecting OPO operation.

Thus, it is seen that an OPO may be used to generate secondary radiation having a wavelength significantly offset from the primary radiation. In many instances, the weaker component ($f_i$) of the secondary radiation is shunted, in that it is not of interest and is not independently tunable with respect to the stronger ($f_s$) component.

In commonly-owned, copending U.S. patent application Ser. No. 544,497 entitled "Stacked Optical Parametric Oscillator" filed on Jun. 27, 1990, there is disclosed a stacked OPO wherein two or more optically nonlinear media, such as crystals, are coaxially disposed in a single resonator. Incident radiation is coupled into the resonator, and causes parametric oscillations of the two crystals. The two crystals are independently tuned, such as by angular orientation, to produce distinct components of secondary radiation. A first one of the crystals is disposed nearer to the source of incident radiation, and a second one of the crystals is disposed nearer to the output coupler of the resonator. This causes the first crystal to experience a greater effective gain. Furthermore, the secondary radiation from the first crystal will tend to dominate and "seed" the secondary radiation from the second crystal, when their bandwidths are narrowly separated. The dominance of the first crystal is controlled in various ways: 1) by shortening the length of the first crystal; 2) by differential bevelling of the first crystal with respect to the optical axis of the resonator; or 3) by detuning the output coupling mirror of the resonator with respect to the output of the first crystal. Either method effectively balances the effective gain of the two crystals so that two, independently tunable and efficient signal frequencies can be achieved. Seeding the OPO stack is also disclosed. Alternate techniques of seeding include the use of a tunable diode laser, a second low power OPO and a second OPO using a Faraday Anomalous Dispersion Optical Filter (FADOF). Techniques for angle tuning the OPO stack and compensating for walkoff are disclosed.

One of the inherent limitations with an OPO is that its output tends to be broader than the pump laser line. This broad output has limited the usefulness of an OPO.

In order to line narrow the OPO output, gratings have, in the past, been placed in the OPO cavity or used to form one of the end mirrors of the optical cavity. Although these arrangements serve to line narrow the OPO output, the additional optical elements in the OPO reduces the overall OPO efficiency, thus limiting its usefulness in low power applications. Furthermore, if the OPO achieves high power operation, the grating can be destroyed.

It is therefore an object of the present invention to provide an OPO having a new and improved arrangement for line narrowing the output.

It is another object of this invention to provide an OPO having a line narrowed output and wherein the amount of the line narrowing can be selectively changed.

It is a further object of this invention to provide an OPO having a variable line narrowed output.

SUMMARY OF THE INVENTION

An optical parametric oscillator having a variable line narrowed output constructed according to the teachings of the present invention includes means for producing a pump beam, an optical resonator, an OPO crystal disposed within said optical resonator aligned with and responsive to said pump beam to produce a parametrically generated output, and means external to said optical resonator for line narrowing the parametrically generated output.

In one embodiment of the invention the line narrowing means comprises a grating and in another embodiment of the invention the line narrowing means comprises an acousto-optic cell.

Various features and advantages will appear from the description to follow. In the description, reference is made to the accompanying drawings which form a part thereof, and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
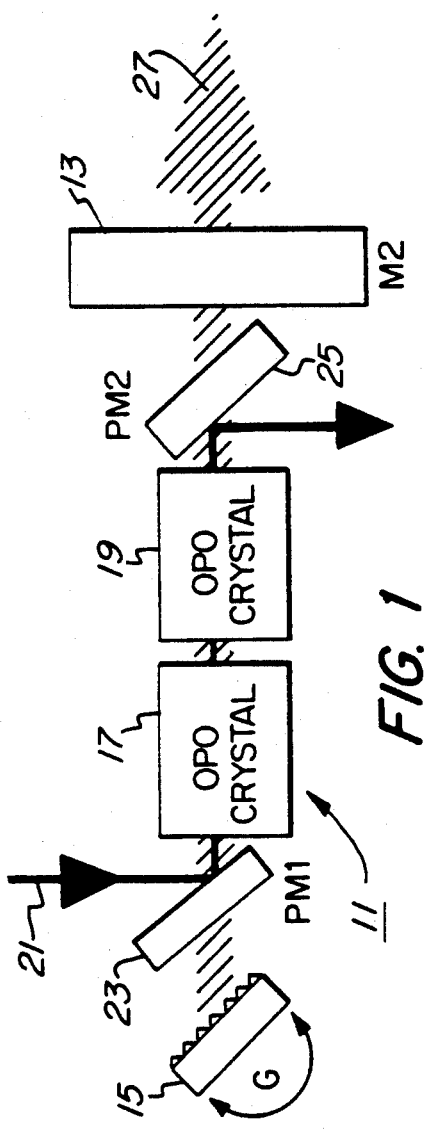
FIG. 1 is a schematic of a prior art OPO in which the output is line narrowed.

Referring now to the drawings, there is shown in FIG. 1 a prior art OPO having a line narrowed output, the OPO being identified by reference numeral 11.

OPO 11 includes an optical resonator defined by a partially transmissive mirror 13 and an angularly tunable grating 15. A pair of stacked OPO crystals 17 and 19 are disposed inside the optical resonator. A pump beam 21 is introduced into the optical resonator through a coupling mirror 23 located inside the optical resonator. Another mirror 25 located inside the resonant cavity couples out the pump beam after it passes through OPO crystals 17 and 19. In the operation of OPO 11, grating 15 serves to line narrow the OPO output beam 27. As can be seen, grating 15 forms a part of the optical resonator and enables the OPO output to be tuned.

Figure 2:
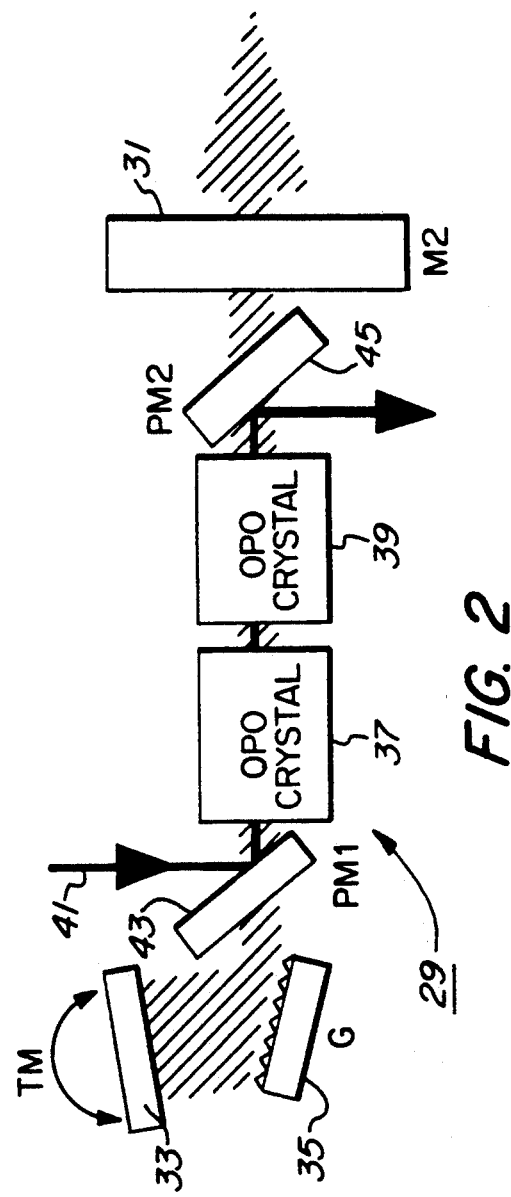
FIG. 2 is a schematic of another prior art OPO in which the output is line narrowed.

Another prior art OPO having a line narrowed output is shown in FIG. 2, the OPO being identified by reference numeral 29.

OPO 29 includes an optical resonator defined by a partially transmissive mirror 31, a rotatably mounted fully reflective mirror 33 and a grating 35. A pair of stacked OPO crystals 37 and 39 are disposed inside the optical resonator. Grating 35 is disposed between mirrors 31 and 33 at grazing angle of incidence, i.e., about 87 degrees relative to the optical axis of crystals 35 and 37. A pump beam 41 is introduced into the optical resonator through a coupling mirror 43. Another mirror 45 couples out the pump beam after it passes through OPO crystals 37 and 39. Besides serving as one of the end mirrors, mirror 33 enables the OPO output to be tuned.

Figure 3:
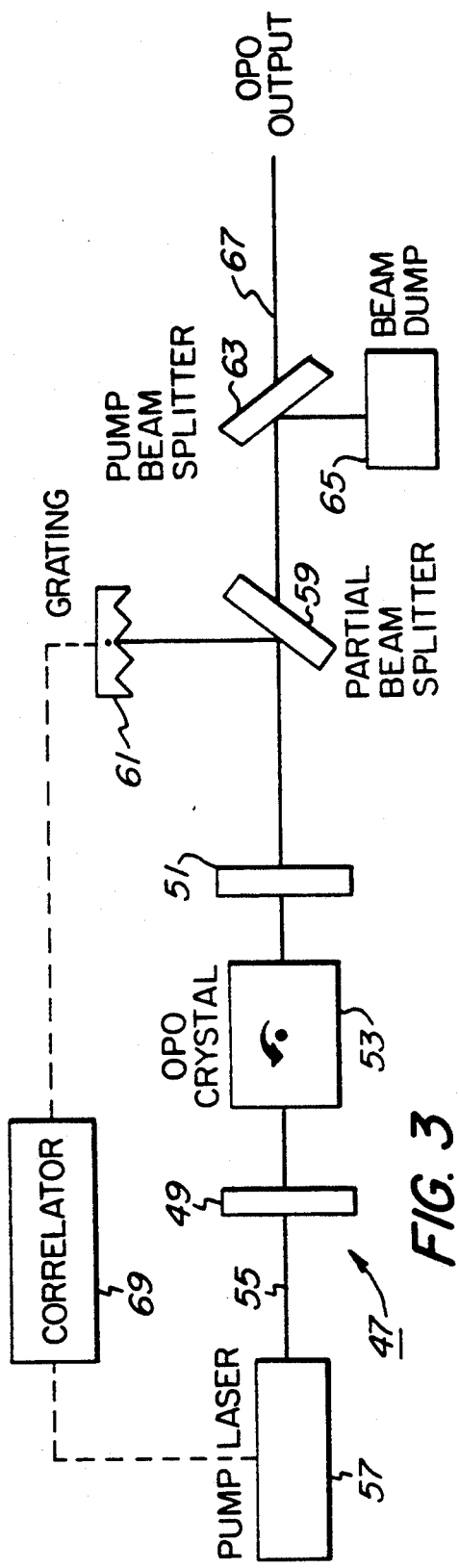
FIG. 3 is a schematic of one embodiment of an OPO having a variable line narrowed output and which is constructed according to the teachings of this invention.

Referring now to FIG. 3, there is shown an OPO constructed according to the teachings of the present invention, the OPO being identified by reference numeral 47.

OPO 47 includes an optical resonator defined by a pair of mirrors 49 and 51. A tunable OPO crystal 53 is disposed in the optical resonator. Crystal 53 may be either angle tuned or temperature tuned. Crystal 53 is end pumped by a beam of light 55 from a pump laser 57. Mirror 49 is highly reflective to the resonated beam within the optical resonator and transmissive to the pump beam 55 from laser 57. Mirror 51 is partially transmissive to the resonated beam and transmissive to the pump beam 55.

A part of the output from the resonant cavity is picked off by a beam splitter 59. This beam splitter may be a simple partial beam splitter, splitting off a portion of the OPO signal or idler wavelength or it may be a dichroic beam splitter which picks off all of the signal or idler and allows the one not picked off to resonate within the OPO cavity. This wavelength narrowed energy is passed back into the optical resonator to seed OPO crystal 53, thus line narrowing the OPO output through positive feedback into the optical resonator. It should be noted that the location of this optical loop can be outside the OPO cavity or in the cavity where the beam splitter 59 is placed between the OPO crystal 53 and the output mirror 51.

The portion of the output beam from the optical resonator that is transmitted through partial beam splitter 59 is directed onto a pump beam splitter 63 which deflects the pump beam to a beam dump 65 and allows the OPO beam transmitted from partial beam splitter 59 to pass through.

The beam transmitted through pump beam splitter 63, identified by reference numeral 67, is the OPO output.

As OPO crystal 53 is wavelength tuned, grating 61 is rotated in order to maintain the wavelength center. If crystal 53 is angle tuned, grating 61 can be driven by gears or belts attached to the crystal rotational stage (not shown). If it is temperature tuned, thermistors may be used to correlate crystal wavelength and a servomotor used to rotate grating 61.

For simplicity, the mechanism employed to correlate crystal tuning and grating angle is shown symbolically as a box 69 labelled correlator.

As can be appreciated, the amount of OPO line narrowing is fixed in that it is determined by the number of grooves/mm of the grating.

Figure 4:
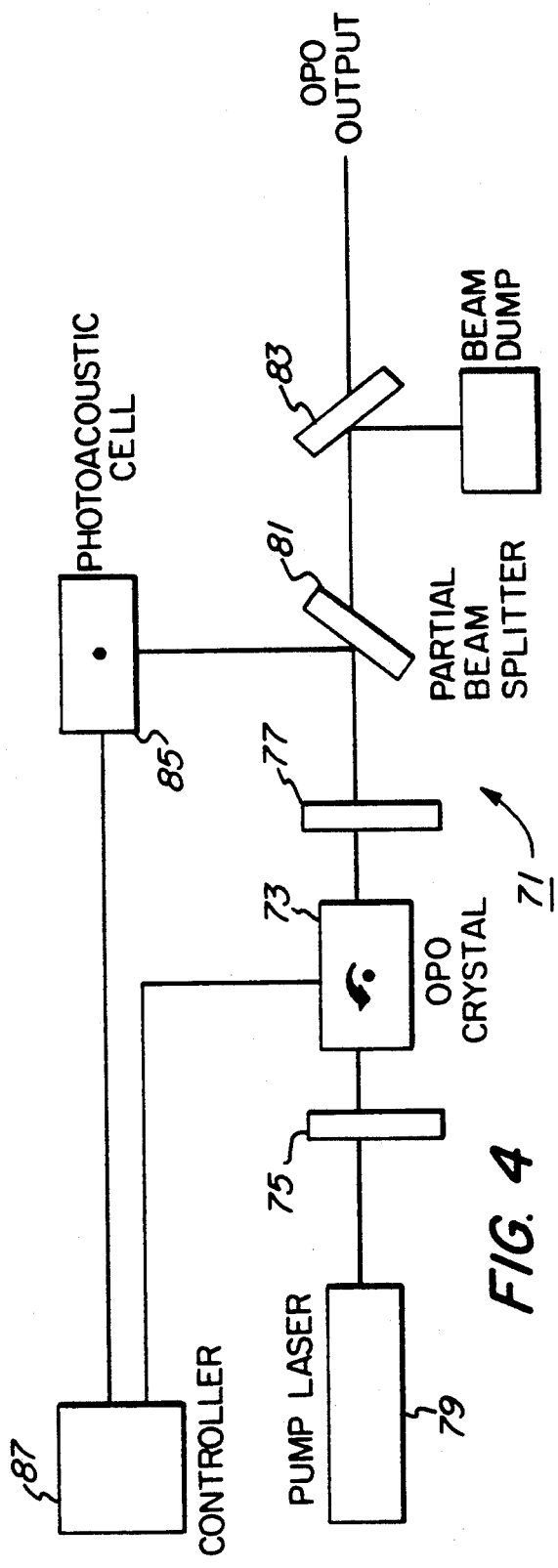
FIG. 4 is a schematic of another embodiment of an OPO having a variable line narrowed output and which is constructed according to the teachings of this invention.

Referring now to FIG. 4, there is shown an OPO in which the amount of line narrowing is adjustable rather than being fixed, the OPO being designated by reference numeral 71.

OPO 71 includes a tunable (either angle or temperature) OPO crystal 73 disposed in an optical resonator defined by a pair of mirrors 75 and 77, a pump laser 79 for end pumping OPO crystal 73, a partial beam splitter 81 for picking off a part of the output beam, and a pump beam splitter 83 for deflecting away the pump beam into a beam dump. The portion of the output beam picked off by partial beam splitter 81 is directed onto a rotatably mounted acousto-optic cell 85.

Acousto-optic cell 85 is composed of a suitable photorefractive material with electrodes (not shown) attached to each side. The active material in cell 85 depends on the wavelengths that the OPO 73 will operate at. In the UV and visible, quartz and water can be used. Lithium niobate and tellurium can be used in the infrared. Such acousto-optic cells have been used as electro-optical scanners and modulators and surface acoustic wave (SAW) devices.

In use, a high frequency AC signal is applied to acousto-optic cell 85 from a variable frequency AC source within a controller 87 creating an acoustic wave which produces refractive index variations through the cell as the acousto-optic material responds to the high frequency signal. These refractive index variations form a grating in which the grooves/mm are determined by the frequency of the signal. Thus, by varying the AC frequency, one can vary the groove spacing of the acousto-optic cell and thus the amount of line narrowing in the OPO 73, and by tuning OPO crystal 73 and rotating cell 85 accordingly, the OPO output can be tuned. The tuning of OPO crystal 73 and rotation of cell 85 are controlled by controller 87.

Various modifications may be made within the scope of this invention. For example, if one cuts the crystal geometry properly, one would not need any OPO mirrors because the created grating in the crystal would act as a cavity mirror in the case where the OPO crystal is extremely transparent to the pump wavelength. The outside of the OPO crystal can be coated on the residual beam sides with a plastic or similar material with suitable absorptive properties to create the acousto-optic effect in the crystal. Also, a second laser at a wavelength that is absorbed by the crystal can be modulated to create the acousto-optic line narrowing in the OPO.

What is claimed is:

1. An OPO comprising:
   a. means for producing a pump beam;
   b. an optical resonator;
   c. an OPO crystal disposed within said optical resonator and responsive to said pump beam to produce a parametrically generated output; and
   d. means external to said optical resonator for line narrowing the parametrically generated output.

2. The OPO of claim 1 and wherein said line narrowing means comprises a grating.

3. The OPO of claim 1 and wherein said line narrowing means comprises an acousto-optic cell.

4. The OPO of claim 1 and wherein said line narrowing means comprises a light modulator.

5. The OPO of claim 4 and wherein said light modulator is an acousto-optic modulator.

6. The OPO of claim 2 and wherein said OPO crystal is tunable and said grating is rotatably mounted.

7. The OPO of claim 3 and wherein said OPO crystal is tunable and said acousto-optic cell is rotatably mounted.

8. The OPO of claim 4 and wherein said OPO crystal is tunable and said light modulator is tunable.

9. An OPO comprising:
   a. means for producing a pump beam;
   b. an optical resonator;
   c. an OPO crystal disposed within said optical resonator and responsive to said pump beam to produce an OPO output beam;
   d. a first beam splitter disposed along the path of said OPO output beam for deflecting away a portion of said OPO output beam;
   e. a grating disposed along the path of said deflected portion of said OPO output beam for reflecting back a line narrowed region of said deflected portion off said first beam splitter and into said optical resonator to seed said OPO crystal; and
   f. a second beam splitter spaced apart from said first beam splitter along the path of said OPO output beam for deflecting away said pump beam from said OPO output beam.

10. The OPO of claim 9 and wherein the OPO crystal is tunable and the grating is rotatable.

11. An OPO comprising:
   a. means for producing a pump beam;
   b. an optical resonator;
   c. an OPO crystal disposed within said optical resonator and responsive to said pump beam to produce an OPO output beam;
   d. a first beam splitter disposed along the path of said OPO output beam for deflecting away a portion of said OPO output beam;
   e. an acousto-optic cell disposed along the path of said deflected portion of said OPO output beam for reflecting back a line narrowed region of said deflected portion off said first beam splitter and into said optical resonator to seed said OPO crystal;
   f. a second beam splitter for deflecting away said pump beam from said OPO output beam; and g. a controller coupled to said OPO crystal and said acousto-optic cell.

12. An OPO comprising:

a laser for producing a pump beam;

an optical resonator defining an OPO cavity and including an OPO crystal for producing an OPO output beam in response to the pump beam;

a first beam splitter for splitting off at least a portion of one of the OPO signal wavelength or idler wavelength, and for allowing the wavelength not split off to resonate within the OPO cavity; and means for reflecting back a line narrowed region of the split-off wavelength off the first beam splitter to seed the OPO crystal.

13. An OPO as claimed in claim 12, wherein the means for reflecting is selected from the group including a grating and an acousto-optic cell.

14. An OPO as defined in claim 12, further comprising a second beam splitter for deflecting away the pump beam from the OPO output beam.

15. An OPO as defined in claim 12, wherein the first beam splitter splits off substantially all of one of the OPO signal wavelength or idler wavelength.

16. An OPO as defined in claim 12, wherein the means for reflecting is located outside of the OPO cavity.

17. An OPO as defined in claim 12, wherein he means for reflecting is located within the OPO cavity.

* * * * *